(12) United States Patent
Weston

(10) Patent No.: US 10,338,679 B2
(45) Date of Patent: Jul. 2, 2019

(54) INTERACTIVE ENTERTAINMENT SYSTEM

(71) Applicant: Infinite Kingdoms, LLC, Wakefield, RI (US)

(72) Inventor: Denise Chapman Weston, Wakefield, RI (US)

(73) Assignee: INFINITE KINGDOMS, LLC, Wakefield, RI (US)

( * ) Notice: Subject to any disclaimer, the term of this patent is extended or adjusted under 35 U.S.C. 154(b) by 0 days.

(21) Appl. No.: 16/001,306

(22) Filed: Jun. 6, 2018

(65) Prior Publication Data

US 2018/0348862 A1    Dec. 6, 2018

Related U.S. Application Data

(60) Provisional application No. 62/516,089, filed on Jun. 6, 2017.

(51) Int. Cl.

| | |
|---|---|
| G06F 3/01 | (2006.01) |
| A63H 13/00 | (2006.01) |
| A63J 19/00 | (2006.01) |
| A41D 27/08 | (2006.01) |
| A41D 11/00 | (2006.01) |
| A63J 7/00 | (2006.01) |
| G06T 19/00 | (2011.01) |
| G08B 3/10 | (2006.01) |
| G08B 5/36 | (2006.01) |
| G08B 5/40 | (2006.01) |

(52) U.S. Cl.
CPC ............ *G06F 3/014* (2013.01); *A41D 11/00* (2013.01); *A41D 27/08* (2013.01); *A63H 13/005* (2013.01); *A63J 7/005* (2013.01); *A63J 19/006* (2013.01); *G06F 3/011* (2013.01); *A63H 2200/00* (2013.01); *G06F 3/016* (2013.01); *G06T 19/006* (2013.01); *G08B 3/10* (2013.01); *G08B 5/36* (2013.01); *G08B 5/40* (2013.01)

(58) Field of Classification Search
None
See application file for complete search history.

(56) References Cited

U.S. PATENT DOCUMENTS

| | | | | |
|---|---|---|---|---|
| 5,729,249 A | * | 3/1998 | Yasutake | G06F 3/0338 345/157 |
| 7,263,462 B2 | * | 8/2007 | Funge | G06N 5/02 702/179 |
| 7,338,375 B1 | * | 3/2008 | Small | F41A 33/02 463/39 |
| 7,862,522 B1 | * | 1/2011 | Barclay | G06F 3/014 414/2 |
| 2002/0111201 A1 | * | 8/2002 | Lang | A63F 13/12 463/2 |
| 2008/0012866 A1 | * | 1/2008 | Forbes | G06T 13/40 345/473 |
| 2010/0142328 A1 | * | 6/2010 | Beck | F41G 3/147 367/129 |

(Continued)

*Primary Examiner* — Carlos Garcia
(74) *Attorney, Agent, or Firm* — Buchanan, Ingersoll & Rooney PC

(57) ABSTRACT

Systems and methods according to the present disclosure provide a costume of a puppet or a character having customizable mixed technology interactive components that enables the wearer of the costume to interact with stimuli in the costume's or wearer's surrounding environment as the puppet or character.

12 Claims, 5 Drawing Sheets

(56) References Cited

U.S. PATENT DOCUMENTS

| | | | |
|---|---|---|---|
| 2016/0037469 A1* | 2/2016 | Smith | H04W 56/0025 370/312 |
| 2016/0184698 A1* | 6/2016 | Tan | A63F 13/216 463/2 |
| 2016/0199602 A1* | 7/2016 | Fernandez | A61M 16/01 128/202.13 |

* cited by examiner

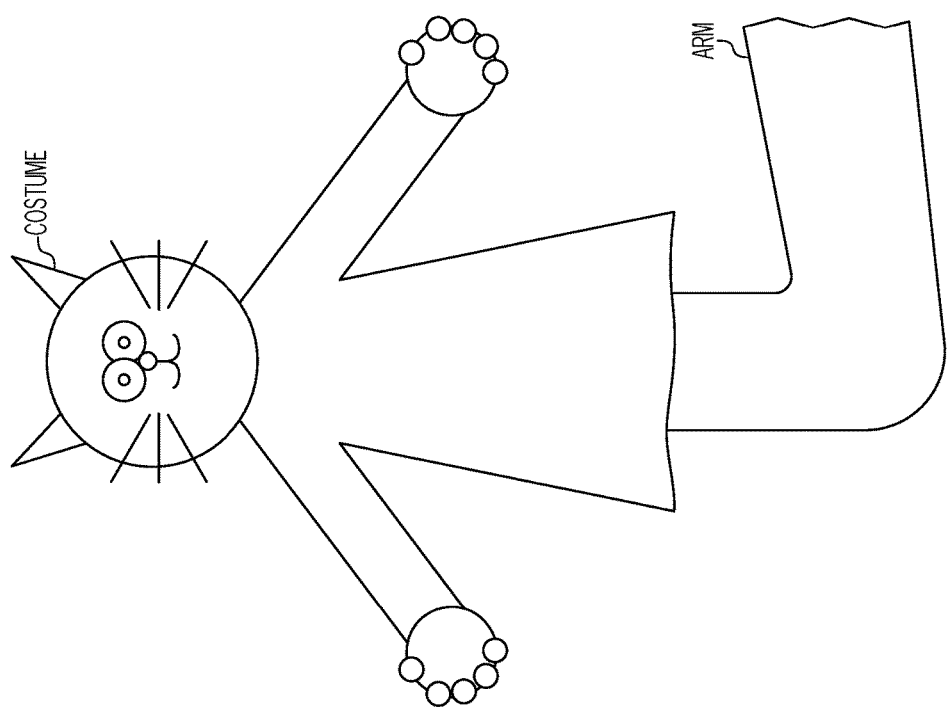

INTERACTIVE ENTERTAINMENT SYSTEM

CROSS-REFERENCE TO RELATED APPLICATION

This application claims the benefit of U.S. Provisional Patent Application No. 62/516,089 filed on Jun. 6, 2017, the disclosure of which is incorporated herein by reference in their entirety.

SUMMARY OF DISCLOSURE

Systems and methods according to the present disclosure provide a puppet or a costume of a puppet or a character having customizable mixed technology interactive and/or animatronic components that enables the wearer of the costume or puppet to interact with stimuli in the costume's or wearer's surrounding environment as the puppet or character.

BRIEF DESCRIPTION OF THE DRAWINGS

The foregoing will be apparent from the following more particular description of example implementations of the invention, as illustrated in the accompanying drawings. The drawings are not necessarily to scale, emphasis instead being placed upon illustrating implementations of the present invention.

FIG. 5 illustrates an interactive puppet according to an example implementation.

For purposes of clarity, not every component may be labeled in every figure. The drawings are not intended to be drawn to scale. Like reference numbers and designations in the various figures indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
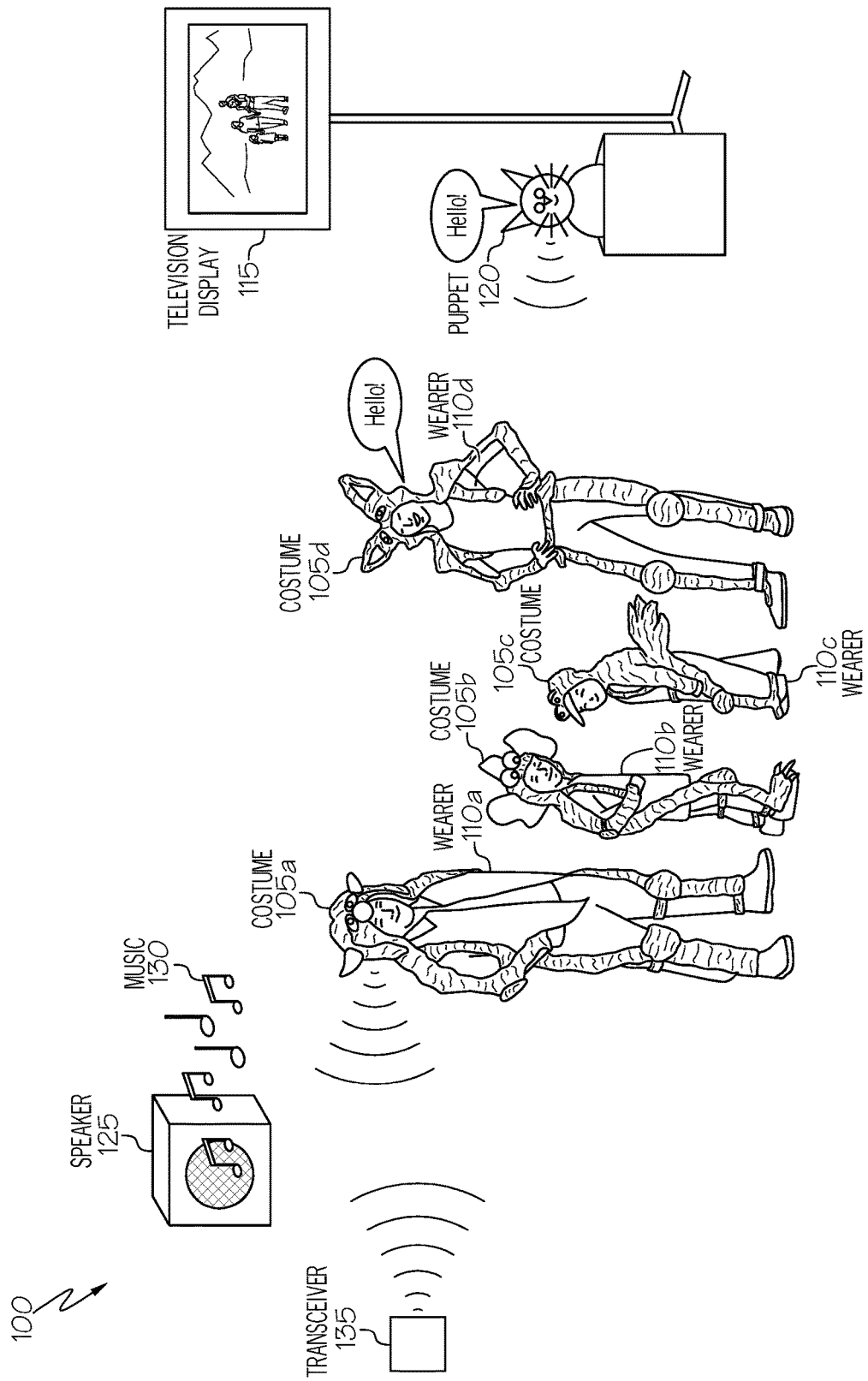
FIG. 1 is a diagram of an environment in which an interactive costume is provided according to an example implementation.

Systems and methods according to the present disclosure provide a costume or puppet of a character having customizable mixed technology interactive components that enables the wearer of the costume or puppet to interact with stimuli in the surrounding environment as the character. FIG. 1 is a diagram of an environment 100 in which a stimuli-responsive interactive costume is provided according to an example implementation. The environment 100 includes four people, such as wearers 105a-d, each wearing an interactive costume 110a-d. The interactive costumes 110a-d may be of a character. As the wearers 105a-d walk through and explore the environment 100, the interactive costumes 110a-d interact with stimuli in the surrounding environment. The stimuli can include lights and sounds from a television 115 or other electronic device, sounds such as music from a speaker 125, lights and sounds from a puppet 120 and signals from a transceiver 135 in the proximity of the wearers 105a-d. For example, as the wearers 105a-d approach the puppet 120, the interactive costumes 105a-d detect the puppet 120 and respond to the sounds, lights, and gestures of the puppet 120 with corresponding sounds and lights. Alternatively, by detecting proximity of the puppet 120, for example by detecting an electronic beacon message (via BLUETOOTH, cellular, WIFI, Near-Field Communication, Zigbee, etc.) transmitted by the puppet 120 or a co-located transceiver, the costumes 105a may take other actions, such as draw attention of the wearers 110 to the puppet 120 via an audio message or tactile or haptic output generated by the costumes 105.

Similarly, the costumes 110a-110d can be configured to detect their proximity to other costumes 110a-110d, e.g., via one of a variety of known peer-to-peer wireless communication protocols, such as BLUETOOTH. In response to detecting another costume in proximity, a costume can be configured to initiate interaction with the other costume, for example by outputting an audio greeting, or activating an animatronic appendage in the form of a wave. In some implementations, costumes in proximity can be configured to "sing" together or otherwise interact and/or exchange data.

Figure 4:
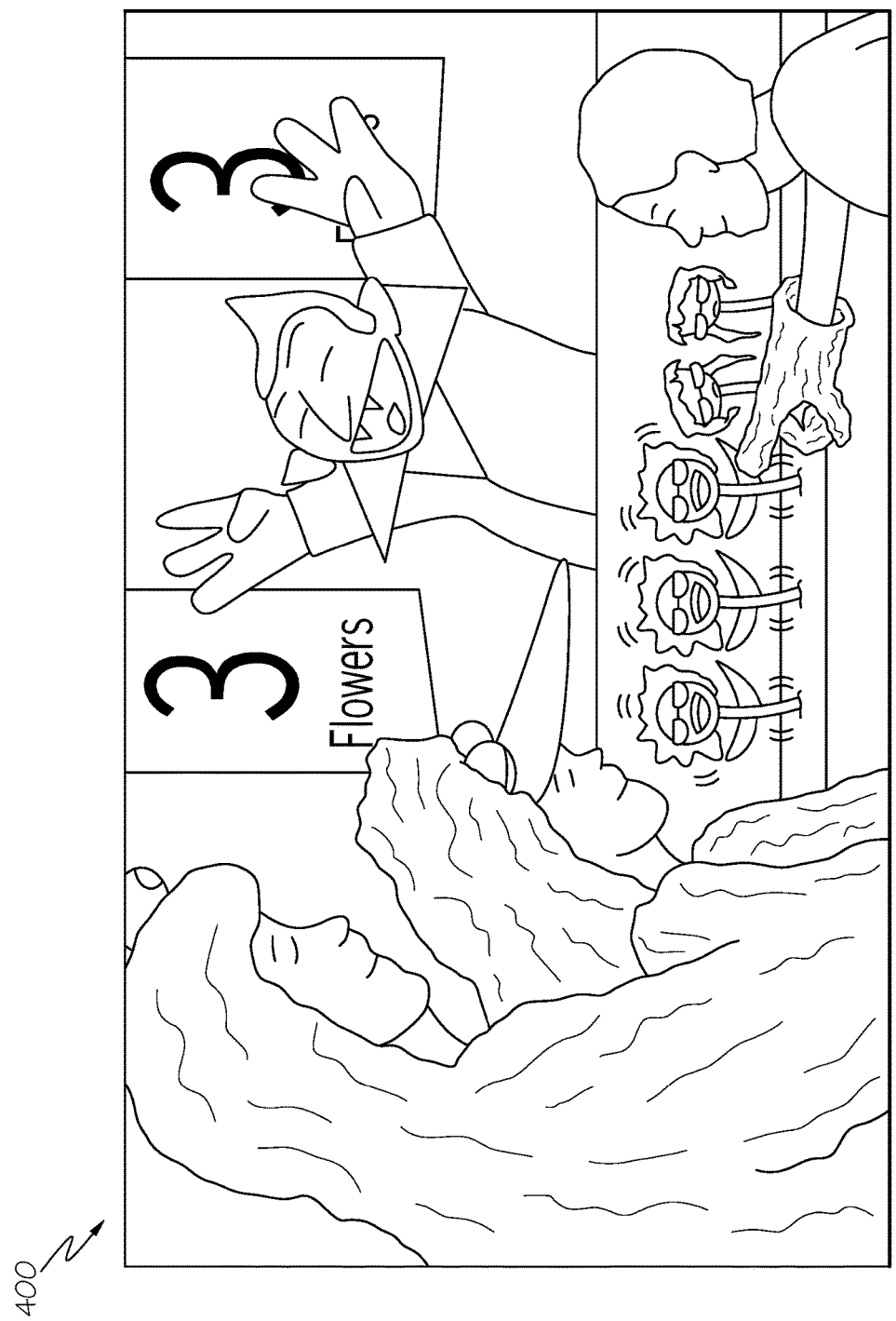
FIG. 4 illustrates an environment in which an interactive costume is provided according to an example implementation.

The environment 100 can be a themed environment. FIG. 4 illustrates an environment 400 in which an interactive costume is provided according to an example implementation. As shown in FIG. 4, two guests in a themed environment are wearing interactive costumes and interacting with an animatronic character and a series of animatronic flowers. The interaction can be facilitated by wireless communication between hardware integrated into the costumes and components of the themed environment. Such communications, may for example, identify the costume type to the environment to customize the interaction with the wearer of the costume. Similarly, wearer preferences, such as desired language might be communicated to the themed environment such that the environment communicates with the wearer of the costume in their desired language. In some implementations, the environment can communicate with the wearer of the costume by wirelessly transmitting audio content to be played through speakers integrated into the costume directly to the wearer, such that individual wearers close to one another can hear different audio content.

In addition, one or more components of the environment may include additional transceivers, such as near field communication transceivers that are able to detect the presence of a costume or a specific part of a costume as it draws near. For example, the flowers can detect a near field communication signal output by a costume glove worn by a visitor to the environment, and respond by moving, singing, laughing, or through some other response.

Figure 2:
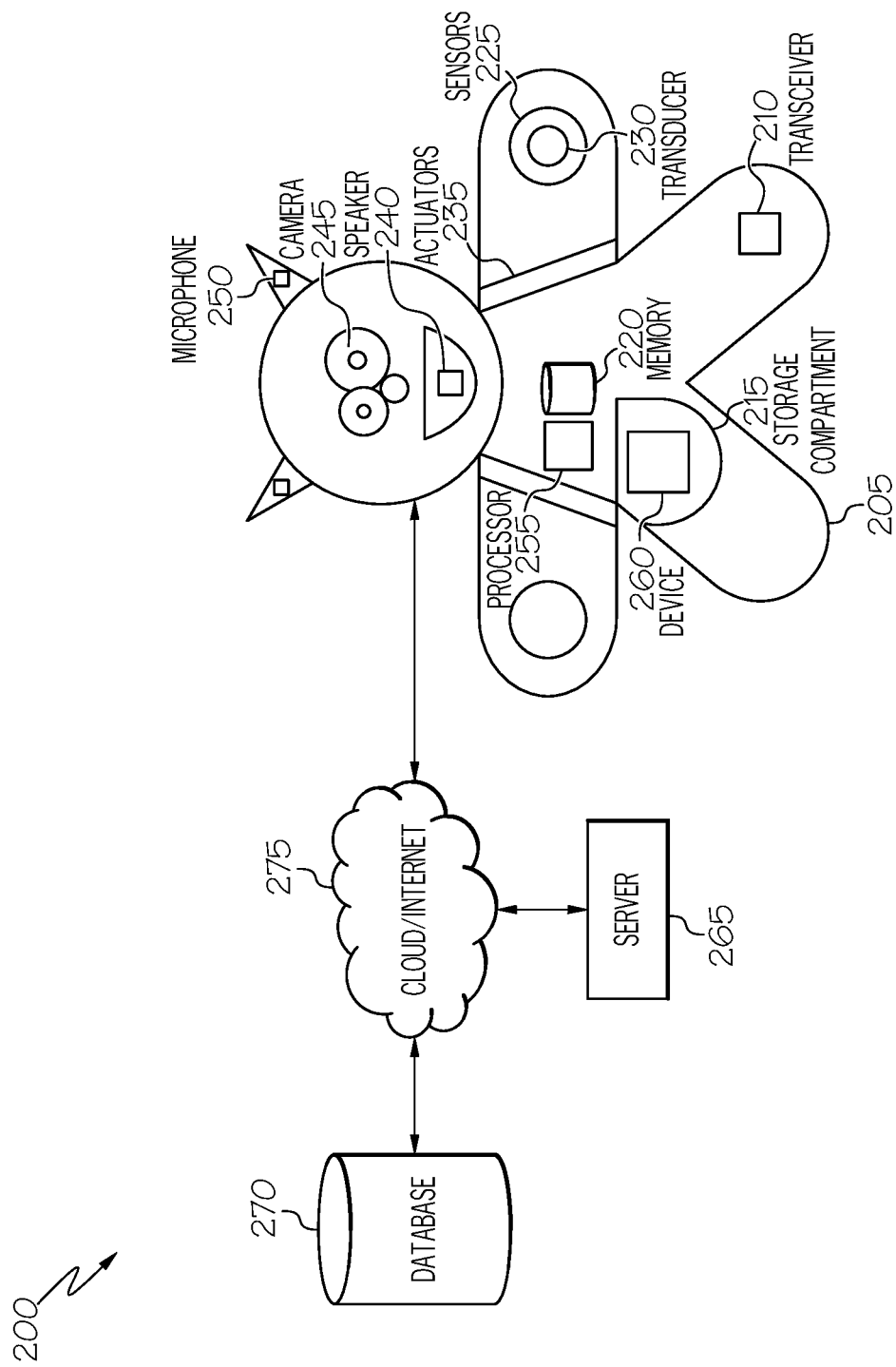
FIG. 2 shows a diagram of an interactive costume system according to an example implementation.

FIG. 2 is a diagram of a system 200 that includes an interactive costume 205 for use in the environments shown in FIGS. 1 and 4. The interactive costume 205 receives sound via a microphone 250, for example, located in its ear. The interactive costume 205 receives and records visual cues via a camera 245 located, for example, in or proximate to its eyes. The costume 205 emits sound via a speaker 240, for example located in its mouth. The costume 205 may also have smaller speakers for outputting audio into the ears of the wearer of the costume 205. The interactive costume 205 can include actuators 235, transducers 230, sensors 225 and transceivers 210 in various locations throughout the costume. The interactive costume 205 can include motion sensors that allow for movement of the various components, e.g., limbs of the wearer, as well as the wearer as whole to be recognized. The costume can include various sensory readers, actuators, and transducers and can produce sensory effects such as gentle squeezing, giggling, nudging, warming, cooling and tapping effects.

The interactive costume 205 includes one or more pouches, such as a compartment 215 throughout to hold hardware (and other items and devices) needed to interact with different technologies. The compartment 215 may be used to carry a device 260 that interfaces with the various components of the costume 205. The device 260 can be a communications device such as a smartphone or tablet or other portable computing device. The smartphone can interface with a server and a memory/storage via the cloud. The interactive costume 205 may have its own processor 255 that interfaces with a memory 220 and which communicates with the smart phone and/or other processors in the cloud. The server may include downloadable programs that can be executed by the processor of the smartphone or a processor of the costume 205. The storage 270 can be a database. The costume 205 can collect various data from its surrounding environment and transmit the collected data to the cloud 275 to the server 265 or the memory 270.

As shown above, in some implementations, the interactive costume takes the form of a body suit or other piece of apparel. In some other embodiments, the interactive costume may be an interactive animatronic puppet integrated into a backpack. The puppet can then appear to be riding "piggyback" on the wearer.

The interactive animatronic puppet integrated into the backpack may include movable parts such as animatronic actuators and transducers. The backpack can have theming elements that costume the wearer of the backpack through add-on pieces (e.g., appendages, facial features, clothing articles, etc.) that include mixed technologies embedded into them. The backpack straps around the wearer and has pouches or compartments throughout to hold the hardware (and other items and devices) needed to interact with different technologies. The interactive animatronic puppet can produce facial expressions and gestures in response to stimuli from its environment (such as the environment 100 in FIG. 1). For example, in some implementations, the animatronic puppet can detect other animatronic puppets and wave to greet them. In some implementations, the animatronic puppet can identify features of an environment and identify them to a user, for example by extending an appendage in front of the wearer's face, pointing toward the identified feature. In some implementations can otherwise interact with the wearer, for example by tapping the shoulder, hugging the wearer, or gently nudging the head of the wearer in a particular direction. The actions of the animatronic puppet can be controlled by a processor either integrated directly into the animatronic puppet, included in a smart phone or other mobile computer device coupled to animatronic puppet through a wired or wireless connection, or via a processor located in the cloud. In some implementations, particularly, when not being worn, the animatronic puppet can operate independently of input from a wearer.

Figure 3:
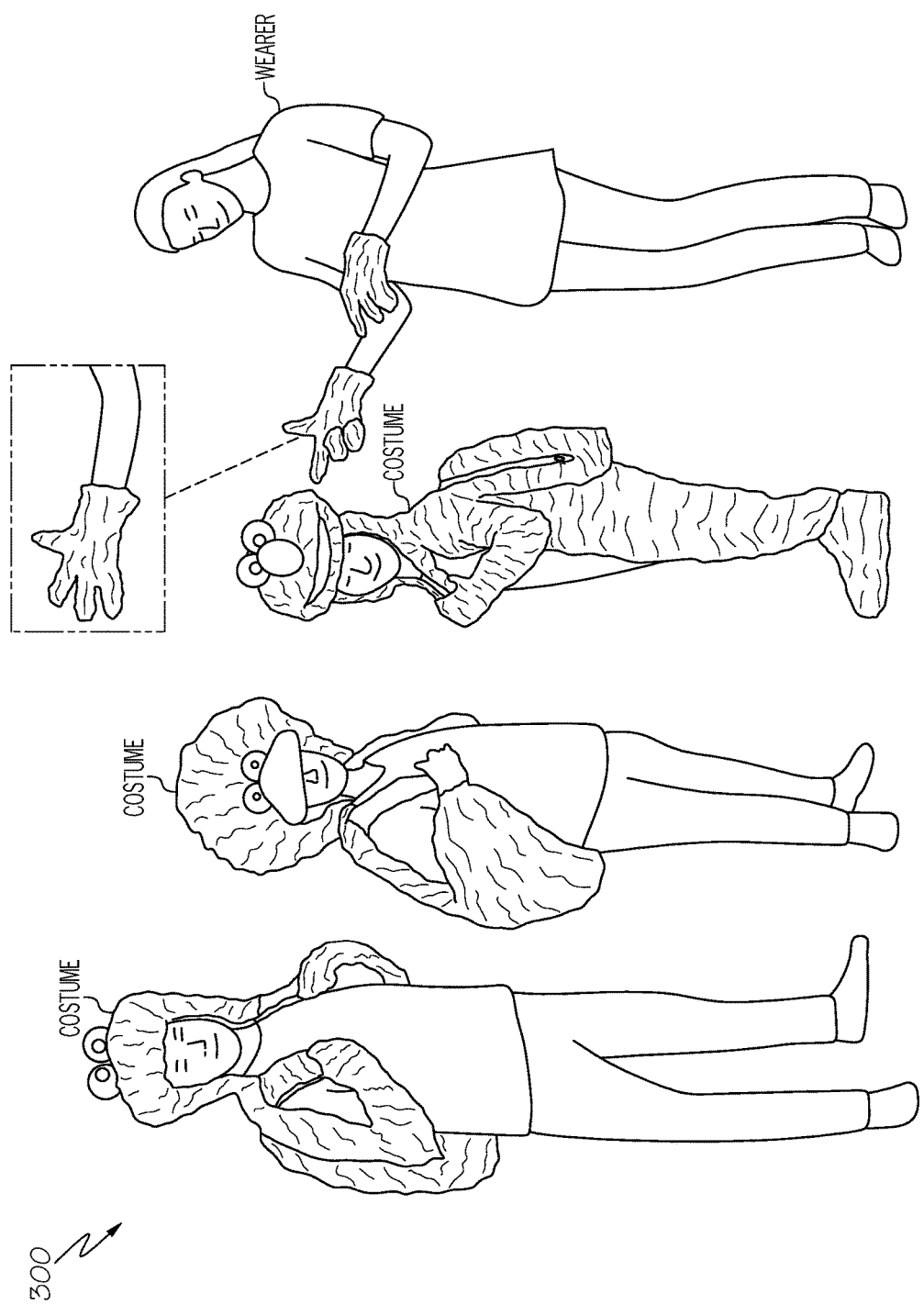
FIG. 3 illustrates different types of interactive costumes according to example implementations.

FIG. 3 illustrates different types of interactive costumes according to example implementations. As shown in FIG. 3, in some embodiments, the interactive costume can be a full body suit with an attached back pack. In some implementations, the interactive costume can be an upper body costume with headgear and a backpack. In some implementations, the interactive costume can be as simple as a glove. Each can have one or more of the components of the interactive costume shown in FIG. 2. As described above, the glove can include a transceiver and sensors, as well as transducers to interact with the surrounding environment and the wearer.

FIG. 5 illustrates an interactive puppet worn on a wearer's arm according to an example implementation. The interactive puppet can be converted into an interactive costume. For example, in FIG. 5, the sleeve of the puppet that goes over the wearer's hand can be pulled over the wearer's head such that the sleeve of the puppet becomes the neck of the interactive costume. A hood can then be zipped onto the neck turning the wearer into a character. The interactive puppet can have much of the functionality and supporting hardware described above in relation to the animatronic backpack.

In some implementations, the interactive costumes and puppets described above can be customized. The customization allows for the costume's or puppet's body, arms, legs and other components to be pieced together with a multitude of interchangeable components. The interchangeable components can provide different functionality, as well as allow the wearer to personalize the costume to their individual tastes. For example, some components may include different lighting elements or audio outputs. The lighting and audio output components can allow the costume to become part of a live entertainment show. Some components may include animatronic features, while others may be mechanically passive. The interactive costume and puppet backpack can include or accept elements such as wings, capes, industrial and robotic parts. The interactive costume can be adjustable based on the wearer's height, weight and size.

The costume and puppets can include an integrated system allowing for communication with a host of interconnected platforms and devices and can produce a variety of experiences for the wearer using sound, mixed reality glasses, vibrations, lights, motion tracking, mobile device activity, hand controllers, IR, RFID, etc. In some implementations that incorporate or interact with wearable displays, the costume and/or puppet can provide and interact with an augmented reality environment.

In some implementations, the backpack and/or costume enable the wearer to "puppet" other devices within an entertainment venue or at in a home environment. For example, motion sensors in the costume can detect movement of the wearer's appendage and communicate those movements to a remote computing device that causes a video or animatronic version of a character to mimic the movements of the wearer, or execute moves indicated by the movements of wearer. For example, the wearer can instruct a video or animatronic version of a character to execute movements indicated by hand or finger gestures detected by the costume. This functionality allows the wearer to have an experience as if they have "virtual strings" are attached to the backpack and costume and its accessories.

As mentioned above, the smartphone or device 260 shown in FIG. 2 may execute various downloadable applications. In one such application, the application can create a virtual representation of the costumed wearer for inclusion in an augmented reality or virtual reality environment or a virtual puppet show. For example, the application which parts of a costume the wearer has access to in order to build a matching costume for a digital environment.

In some implementations, an application can leverage location detection functionality of the smart phone, such as GPS, to help direct or navigate a wearer of the costume through an environment, such as a theme park or convention center. The application can cause the costume to alert the user to attractions or other items of interest, such as parades or other live entertainment, or restaurants or other shopping venues. The use can configure the app with their individual interests through a graphical user interface displayed on the mobile device or a via separate web browser.

Some applications can control the overall mode of operation of the costume. For example, the application can switch the costume between a parental mode, a child mode, a learning mode, an exploratory mode, and a silly mode to adjust a mode of play using the costume. In some implementations, the interactive costume and puppet backpack can operate in a team/family mode that allows the characters of the interactive costume and puppet backpack to interact with each other, creating new ways of communicating between the wearers.

In some implementations, the applications can enable the costume to acquire new skills over time. For example, the applications can execute one or more machine learning algorithms to detect frequent behaviors or preferences of the wearer. For example, the application can learn which entertainment attractions or experiences are preferred by a user, for example, by measuring and storing heart rates or skin conductance data of the wearer over time as they experience various activities. The learning algorithm can further take into account direct user feedback entered into the application via speech recognition software or a graphical user interface.

In some implementations, the applications can enable the costume to produce other experiences that can create fun connections between other devices such as smart devices. For example, the costume system can be integrated with home lighting systems, turning on lights as a wearer of a costume enters a room. The applications can also pair with other commonly themed toys or items of home decor. The application can also pair with a home entertainment system, for example a media player, triggering the streaming of media matching the theme of costume to media player in proximity. For example, the playing of a theme song corresponding to a character could be automatically triggered on a stereo system as a costume associated with that character enters the room with the stereo system.

The application can also be used to track the location of the wearer to alert caregivers, parents, guardians or friends of the wearer's whereabouts. Virtual fencing can be used to alert such persons when the wearer leaves a particular geography or separates from a wearer of another specified costume by more than a selected distance.

In some implementations, an application connected to the costume can cause the puppet packs to respond to related streaming shows. For example, the costume can receive the streamed media at the same time as a media player, and respond in synchronicity, for example, by singing along or dancing to the media.

The interactive costume and the puppet backpack can provide a learning system by communicating with the wearer. For example, the application can teach the wearer, using the costume, how to navigate a particular environment by controlling transducers in the costume that produce vibrations that can nudge in a particular direction. In addition, the costume can nudge the wearer to notice something in the environment while audio about the identified object is output through the costumes speakers. In another example, the costume and application can be used in a dance class to teach a wearer a particular dance. For example, the costume or backpack can direct the wearer through specific dance steps by whispering the instructions into the wearer's ear in combination with a gentle vibration produced against the wearer's arm, leg or other body part.

In some embodiments, the costume and puppet backpack can be waterproof and therefore, submerged in water. The costume and puppet backpack can be worn in a wet interactive environment such as an interactive water attraction or interactive water park.

The interactive costume and puppet backpack can serve members of the special needs community in a fun and lighthearted manner. For example, interactive costume and puppet backpack can assist autistic, deaf, blind or developmentally challenged individuals.

What is claimed is:

1. A system comprising:
    an interactive environment comprising one or more sensors, processors, and/or transmitters; and
    a costume or puppet comprising one or more sensors, processors, and/or transmitters, and an animatronic feature, wherein the costume or puppet stores information regarding a wearer of the costume or puppet,
    wherein the sensors of the interactive environment detect signals transmitted by the costume or puppet that comprise the information regarding the wearer,
    wherein the sensors of the puppet or costume detect signals transmitted by the interactive environment,
    wherein, in response to detecting, by the sensors of the interactive environment, the signals transmitted by the costume or puppet, the one or more processors of the interactive environment determine an appropriate response to be produced in the interactive environment based on the information regarding the wearer; and
    wherein, in response to detecting, by the sensors of the costume or puppet, the appropriate response produced in the interactive environment, operating, by the one or more processors of the costume or puppet, the animatronic feature of the costume or puppet to physically interact with the wearer of the costume or puppet in a direction of the appropriate response in the interactive environment.

2. The system of claim 1, wherein the response to be produced comprises sound, light, tactile output, haptic output or vibration, smoke, video, or movement of features.

3. The system of claim 2, wherein the response occurs within the interactive environment.

4. The system of claim 2, wherein the response occurs within the puppet or costume.

5. The system of claim 1, wherein the response comprises a virtual reality or augmented reality effect.

6. The system of claim 1, wherein signals are detected using an electronic beacon message.

7. The system of claim 1, wherein the puppets or costumes are capable of detecting the presence of other puppets or costumes, and the puppets or costumes are capable of interacting with each other.

8. The system of claim 1, wherein an external device may be used to serve as or augment the processor for interacting with the interactive environment or costume or puppet.

9. The system of claim 8, wherein the external device includes a smart phone.

10. The system of claim 8, wherein the external device includes a tracking or detection system capable of detecting visual, audio, tactile, motion-based, or electronic or other sensory cues, either within the interactive environment or in any other environment.

11. The system of claim 1, wherein the responses triggered may be modified based on machine learning.

12. A method comprising:
    by one or more processors associated with a costume or puppet, transmitting one or more signals comprising information regarding a wearer of the costume or puppet to sensors of an interactive environment;

by the one or more processors, determining that the interactive environment produced a response to the transmission;

by the one or more processors, determining a relative direction of the response in the interactive environment with respect to the wearer; and by the one or more processors, in response to determining that the interactive environment produced the response to the transmission, operating an animatronic feature of the costume or puppet to physically interact with the wearer of the costume or puppet in the relative direction of the response in the interactive environment.

* * * * *